US008782318B2

(12) United States Patent
Sharma et al.

(10) Patent No.: US 8,782,318 B2
(45) Date of Patent: Jul. 15, 2014

(54) INCREASING INPUT OUTPUT HUBS IN CONSTRAINED LINK BASED MULTI-PROCESSOR SYSTEMS

(75) Inventors: Debendra Das Sharma, Santa Clara, CA (US); Chandra P. Joshi, Bangalore (IN); Gurushankar Rajamani, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 13/039,119

(22) Filed: Mar. 2, 2011

(65) Prior Publication Data

US 2012/0226848 A1    Sep. 6, 2012

(51) Int. Cl.
G06F 13/36    (2006.01)
G06F 13/20    (2006.01)
(52) U.S. Cl.
USPC ........... 710/312; 710/310; 710/311; 710/313; 710/314; 710/315
(58) Field of Classification Search
USPC .......................... 710/300, 305–306, 309–316
See application file for complete search history.

(56) References Cited

U.S. PATENT DOCUMENTS 6,009,488 A    12/1999  Kaviprapu
6,920,519 B1   7/2005   Beukema et al.
2002/0184328 A1* 12/2002 Richardson et al. .......... 709/213
2003/0041212 A1  2/2003  Creta et al.
2004/0019728 A1  1/2004  Sharma
2008/0071961 A1* 3/2008  Higuchi et al. ............... 710/312
2008/0212506 A1  9/2008  Lee et al.
2010/0064086 A1* 3/2010  McCarty et al. .............. 710/300

FOREIGN PATENT DOCUMENTS

WO    2012/118552 A2    9/2012
WO    2012/118552 A3    11/2012

OTHER PUBLICATIONS

"Intel® 5520 Chipset and Intel® 5500 Chipset". Datasheet. Mar. 2009. Intel Corporation. Order No. 321328-001.*
Intel® 5520 Chipset (Intel® 5520 I/O Hub). Intel Corporation. Retrieved from Internet Apr. 1, 2013. <http://ark.intel.com/products/36783/Intel-5520-IO-Hub>.*
International Search Report and Written Opinion received for International Patent Application No. PCT/US2011/066562, mailed on Sep. 17, 2012, 9 pages.
Debendra Das Sharma, Intel® 5520 Chipset: An I/O Hub Chipset for Server, Workstation, and High End Desktop, Aug. 2009, Intel Corporation Hot Chips, 18 pages.

* cited by examiner

Primary Examiner — Thomas J Cleary
(74) Attorney, Agent, or Firm — Caven & Aghevli LLC

(57) ABSTRACT

Methods and apparatus relating to increase Input Output Hubs in constrained link based multi-processor systems are described. In one embodiment, a first input output hub (IOH) and a second IOH are coupled a link interconnect and a plurality of processors, coupled to the first and second IOHs include pre-allocated resources for a single IOH. Other embodiments are also disclosed and claimed.

20 Claims, 4 Drawing Sheets

INCREASING INPUT OUTPUT HUBS IN CONSTRAINED LINK BASED MULTI-PROCESSOR SYSTEMS

FIELD

The present disclosure generally relates to the field of electronics. More particularly, some embodiments relate to increasing Input Output Hubs in constrained link based multi-processor systems.

BACKGROUND

Central Processing Units (CPUs) may communicate with Input/Output (IO) devices via an Input Output Hub (IOH). Some CPUs may be only capable of supporting a single IOH for example due to lack of resources. This issue may reduce performance, reduce IO throughput, increase IO latency, etc. in such systems.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may provide a cost effective, high performance, and/or balanced solution to increase the number of Input Output Hubs (IOHs) in link based multi-processor system. For example, such techniques may be utilized where a CPU (which may interchangeably be referred to herein as a "processor") may not be able to support additional number of IOH(s) or does not have the resources to add more IOHs. In an embodiment, each processor may include one or more processor cores. Also, one or more processor cores and a plurality of IOHs discussed herein may be present on a single Integrated Circuit (IC) die in an embodiment.

Figure 1:
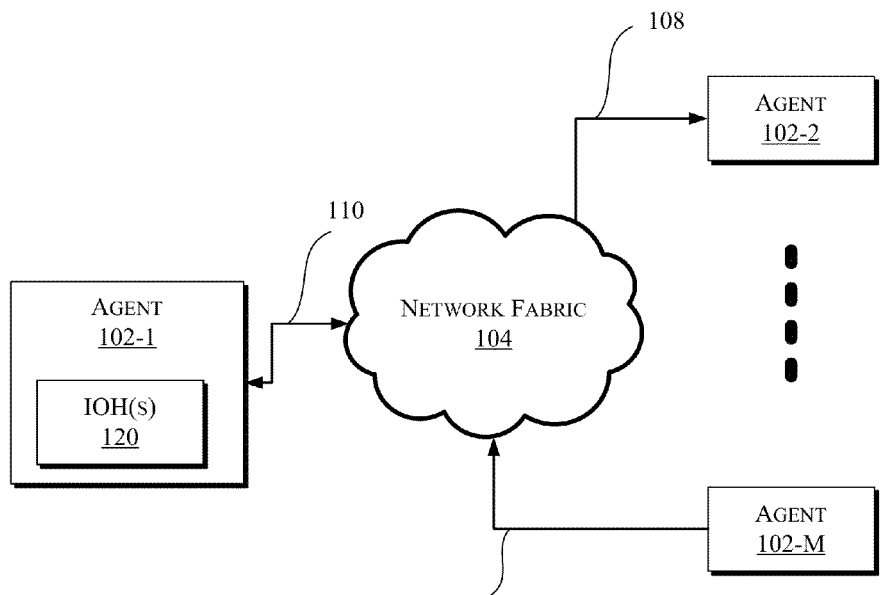
FIG. 1 illustrates a block diagram of a computing system, according to an embodiment.

Various embodiments are discussed herein with reference to a computing system component, such as the components discussed herein, e.g., with reference to FIGS. 1-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the systems discussed herein.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Also, in accordance with an embodiment, one or more of the agents 102 may include one or more IOHs 120 as will be further discussed with reference to FIG. 2. for example.

Figure 2:
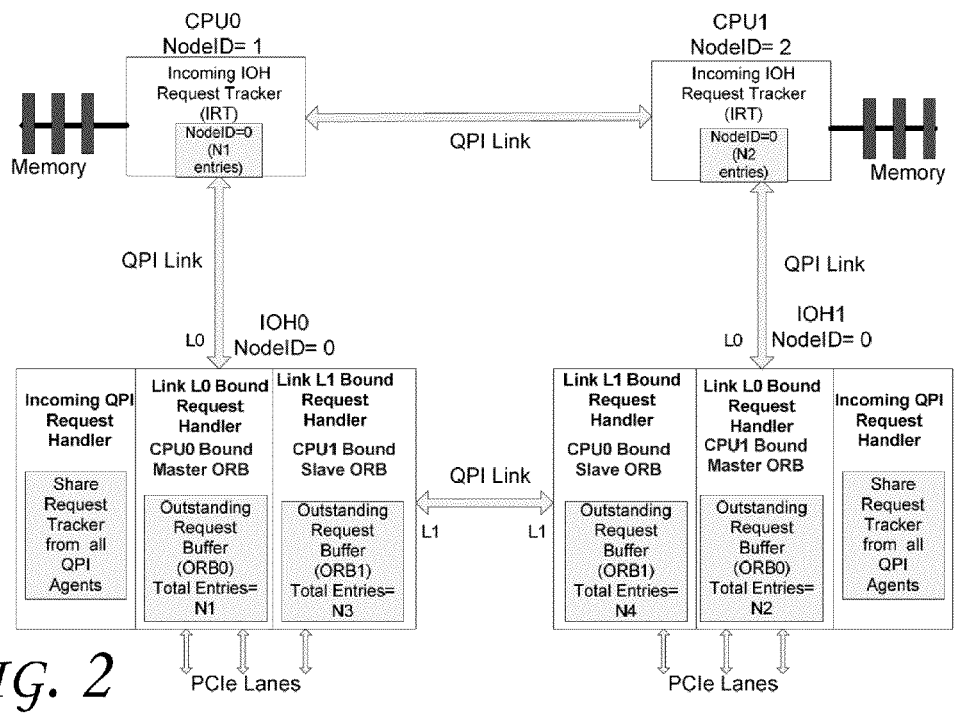
FIGS. 2 and 4-5 illustrate block diagrams of computing systems with multiple IOHs, according to some embodiments.

More specifically, FIG. 2 is a block diagram of a computing system 200 in accordance with an embodiment. In an embodiment, a Quick Path Interconnect (QPI) based system may be used in the system of FIG. 2. Generally, QPI is a link interconnect, used to couple agents in system (such as the agents discussed with reference to FIG. 1). Agents coupled through QPI may be characterized as QPI agents. QPI link is a layered architecture. A layer called "link layer" implements a per message class credit mechanism for information transfer (between the agents in the system) and at the receiving end if there are sufficient buffers to hold received message. Even though QPI is used to describe various embodiments, the embodiments of the present invention are not limited to QPI and any type of a link or point-to-point (e.g., serial) interconnect may be used.

In an embodiment such as shown in FIG. 2, each CPU agent has two QPI links. IOH agents (e.g., IOH0 and IOH1) have two QPI links and input/output devices coupled on other side though a PCIe lanes interfaces (Peripheral Component Interconnect Express™ (PCIe) interconnect (in accordance with the PCI Express™ Specification Base Specification version 2.0 (published Jan. 17, 2007)). In an embodiment, one or more of the IOH agents may also have some other acceleration technology incorporated in some embodiments.

Generally, one QPI requirement is that a CPU agent needs to have pre-allocated resources for every QPI agents in system from whom it may receive requests. For example, an Incoming Request Tracker (IRT) is one kind of such pre-allocated resource used to track incoming requests. In some current implementations, the CPU design may have pre-allocated resources for two more QPI agents (one IOH and one CPU agent). The single IOH agent may have a shared resource pool for all QPI agents in system. Requests received by any QPI agents is identified by tuple <Sender's NodeID, Senders's RequestID>. Generally, the number of requests sent to a CPU by a QPI sender may not exceed resources pre-allocated in receiving CPU to sender. CPUs may not have route through hardware to pass requests or messages from one QPI link to other QPI link in some implementations. A QPI agent may send requests to any other QPI agent in system.

Moreover, a single IOH may be named IOH0 with NodeID=0 which handles outstanding requests on Link L0 (CPU0 bound) in ORB0 and it has N1 entries. IOH0 may handle outstanding requests on Link L1 (CPU1 bound) in ORB1 and it may have N2 entries. Each CPU is in turn coupled to one more CPU and IOH0. Also, the single IOH may be coupled to both CPU0 and CPU1.

In the example system having a single IOH, if there is a need to have one more IOH (e.g., to increase total number of Input Output Devices or other platform level features provided by IOH), additional IOHs may not be used in part because of following three major reasons: (1) by adding one more IOH (a QPI agent) there is need to increase resources (such as IRT tracker) in the CPU due to pre-allocation requirement of QPI protocol; (2) CPU may recognize only two more node IDs and therefore it will not be able to recognize the newly added QPI agent; and (3) CPU may have only two links and adding one more IOH may need a route through path in CPU. As a result, adding these feature may require major changes in CPU hardware that may be very costly.

To this end, one embodiment adds one or more IOHs by making changes in the IOH. This solution may utilize the exiting IOH hardware and add extra logic that is relatively cheaper than changing the CPU design as further discussed below.

More particularly, referring to FIG. 2, a QPI link based multi-processor system is shown with additions to existing IOH hardware for a second IOH. In some embodiments, more than one IOH may be added utilizing the techniques discussed herein. In the system of FIG. 2, there are two CPU agents, named CPU0 and CPU1 with NodeIDs 1 and 2, respectively. CPU0 has N1 reserved pre-allocated IRT entries for IOH0 and CPU1 has N2 pre-allocated IRT entries for IOH0. Two IOH, named IOH0 and IOH1, may both share the same NodeID 0. CPU0 is coupled to CPU1 and IOH0 and still has pre-allocated IRT resources for single IOH with NodeID 0 only. CPU0 here is assuming that there is only one IOH. CPU1 is coupled to CPU0 and IOH1 and still has pre-allocated IRT resources for a single IOH with NodeID 0 only. CPU1 here is assuming that there is only one IOH. IOH0 and IOH1 are using their QPI link (L0) to couple to one CPU (here CPU0 and CPU1, respectively). Second link (L1) of IOH0 and IOH1 is used to couple the IOHs to each other as shown.

Figure 3:
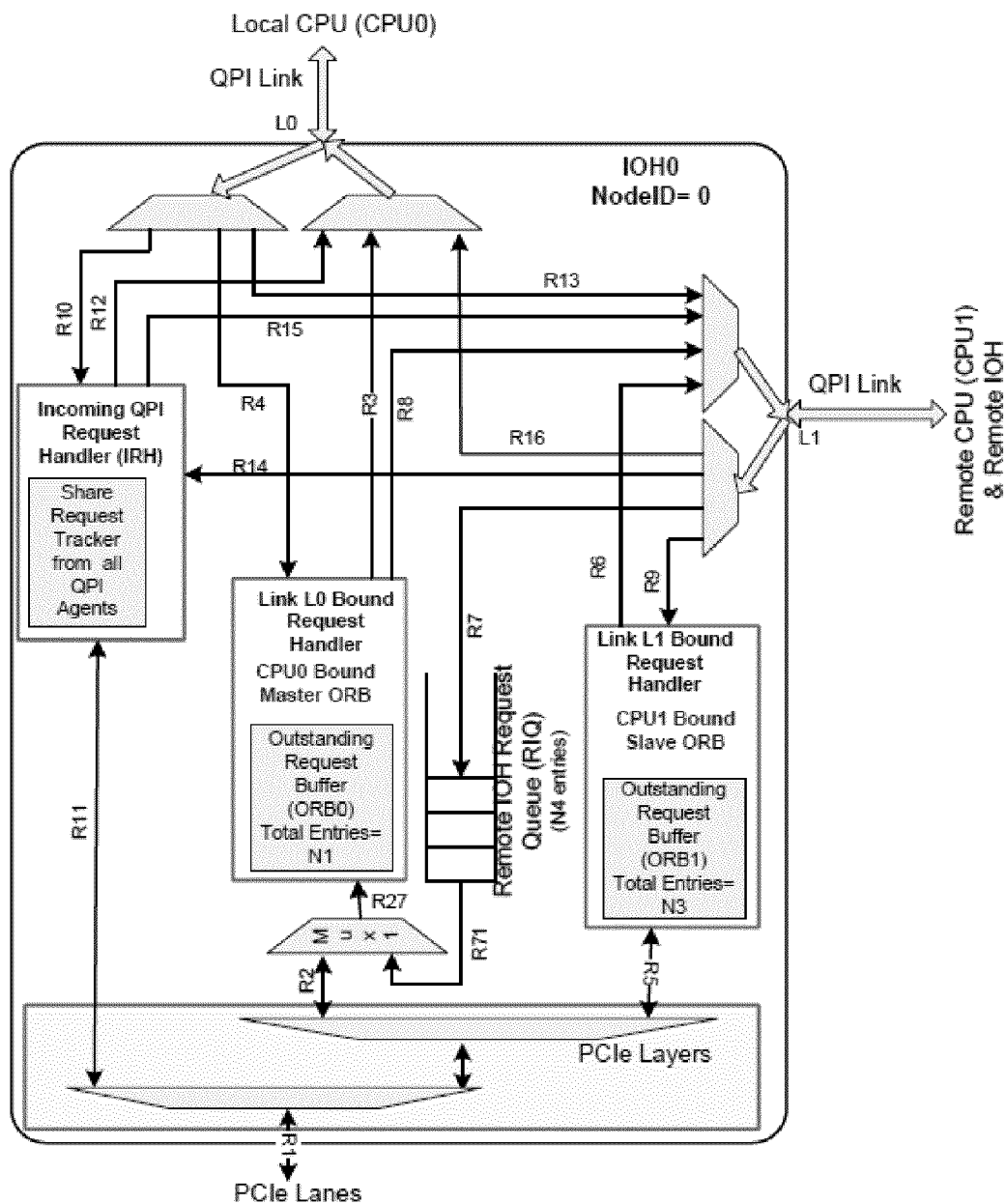
FIG. 3 illustrates a block diagram of contents of an added IOH, according to an embodiment.

FIG. 3 illustrates a block diagram of components and coupling inside the added IOH (e.g., IOH1 discussed with reference to FIG. 2), according to an embodiment. Following are some details listed for IOH0 and similar details should be interpreted for IOH1 as well, in accordance with some embodiments:

1. Master ORB or ORB0: In single IOH based system, ORB0 is used to store/handle requests from PCIe agents that are targeted to CPU0. In a two IOH based system, ORB0 may handle all requests bound to locally coupled CPU (i.e. CPU0). This may include requests originated from local PCIe agents as well as requests originated from remote IOH (IOH1 in this case).
   a. ORB0 still has a number of entries equal to pre-allocated IRT resources in CPU0 for IOH (NodeID=0).
   b. These available ORBs are shared between local PCIe request and requests coming from remote IOH.
2. Slave ORB or ORB1: In single IOH based system, ORB1 is used to store/handle requests from PCIe agents that are targeted to CPU1. In a two IOH based system, ORB1 handles requests originated from local PCIe agents that are bound to remote CPU (i.e. CPU1) and remote IOH (i.e. IOH1).
   a. ORB1 may have entries (N3) more than what remote CPU1 can pre-allocate for IOHs (NodeID=0) (N2 entries). In some embodiments, the "home" IOH has the responsibility to ensure that this over-subscription does not exceed the CPU pre-allocation limit and/or to ensure that the transactions do not deadlock with a timer that flushes all outstanding cache lines it has ownership of in the unlikely event it detects a deadlock.
3. RIQ: There is a queue called "Remote IOH Request Queue (RIQ)" that temporarily stores/holds request coming from remote IOH (IOH1) and targeted to CPU0. The number of entries in this queue may be equal to the number of ORB1 entries in IOH1. This allows ORB1 in remote IOH (IOH1) to have more entries than local ORB0 to allow hiding of latency for remote request processing.
4. MUX1: A multiplexer selection logic (Mux1) selects requests from local PCIe agents and RIQ.
5. IRH: "Incoming QPI Request Handler" (IRH) is used to store/handle QPI requests originated from any other QPI agent in the system and targeted to that IOH. It may have shared resources that are used for all requesting agents.
6. Path R3 is a request path for all types of requests, from Master ORB to QPI link coupling to local CPU (i.e. Link L0).
7. Path R4: This is a path for all responses received from local CPU against request sent by master ORB.
8. Paths R6 & R9: R6 is path for all locally originated request and targeted to remote IOH or remote CPU. R9 is path for responses received from remote IOH or CPU against requests sent through R6.
9. Paths R7, R71 are for all requests originated from remote IOH and targeted to CPU0.
10. Path R8 is for all responses against requests received through R7 path response for remote IOH originated requests.
11. Path R13 is a route through path from Link L0 to Link L1 for all requests originated at local CPU (CPU0) and targeted to remote IOH (IOH1).
12. Path R16: This path is for a response route through path from L1 to L0 against requests originated at local CPU (CPU0) and targeted to remote IOH (IOH1).

Figure 4:
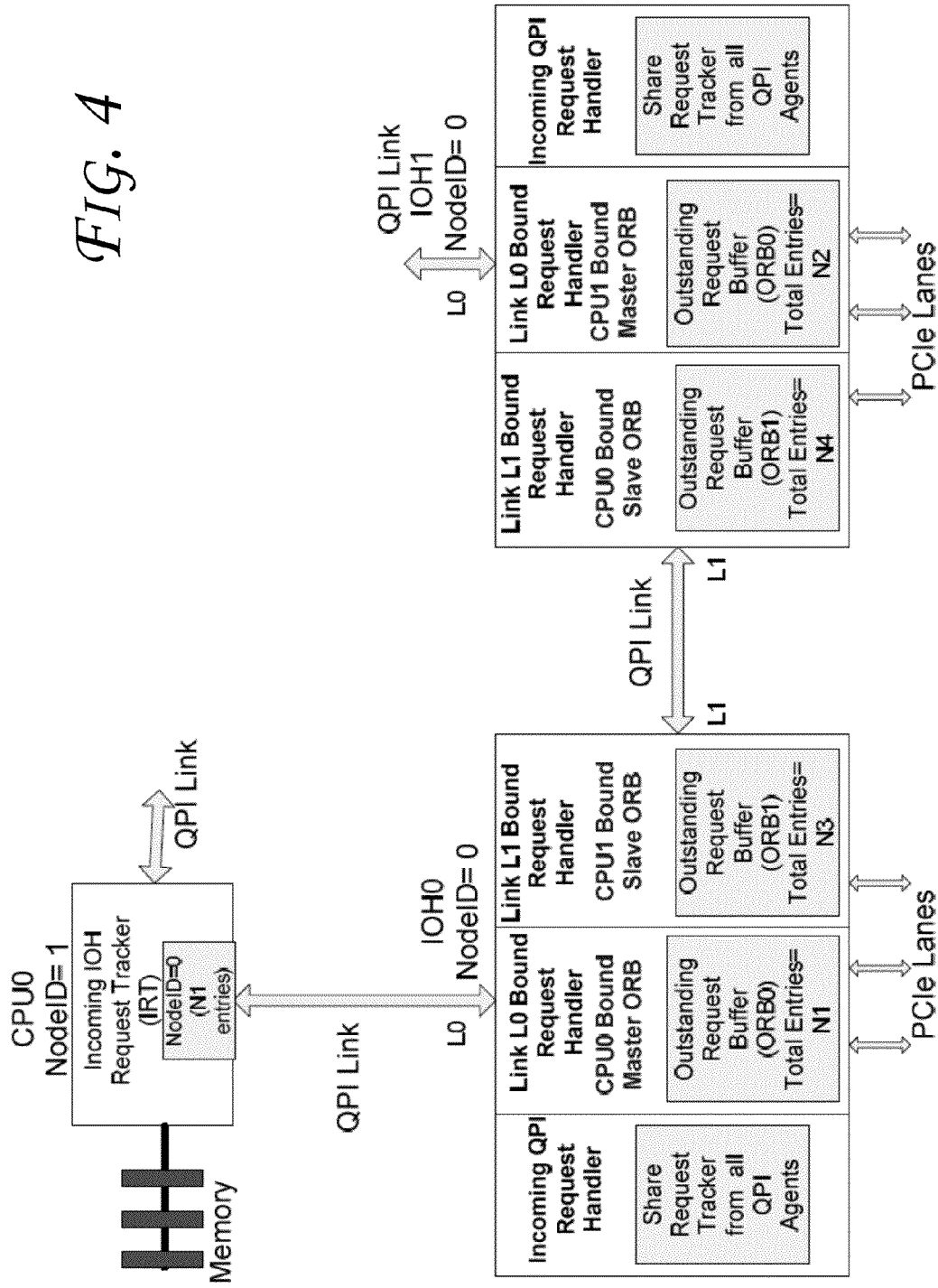

In some embodiments, these techniques may be scaled. Moreover, the embodiments explained are to add a second IOH in system with two CPU with one IOH where CPU does not have route through path across its links and pre-allocation of resources to handle requests from other QPI agents is required. This may be scaled to following architecture also: adding extra IOH in One CPU with one IOH. For example, if there is one CPU that has architecture as explained above and in addition to that if CPU or IOH has some constraints such that IOH may be coupled to only one link of CPU, then the similar techniques may be used to add one more IOH to such a system as shown in FIG. 4.

Adding m extra IOH in System with n CPU and m IOH may be provided in some embodiments, e.g., in a system that has n CPU agents and m IOH agents, where n,m >2. Due to the large number of CPUs, the system may require CPUs with multiple QPI link and route through support across links in CPU.

Figure 5:
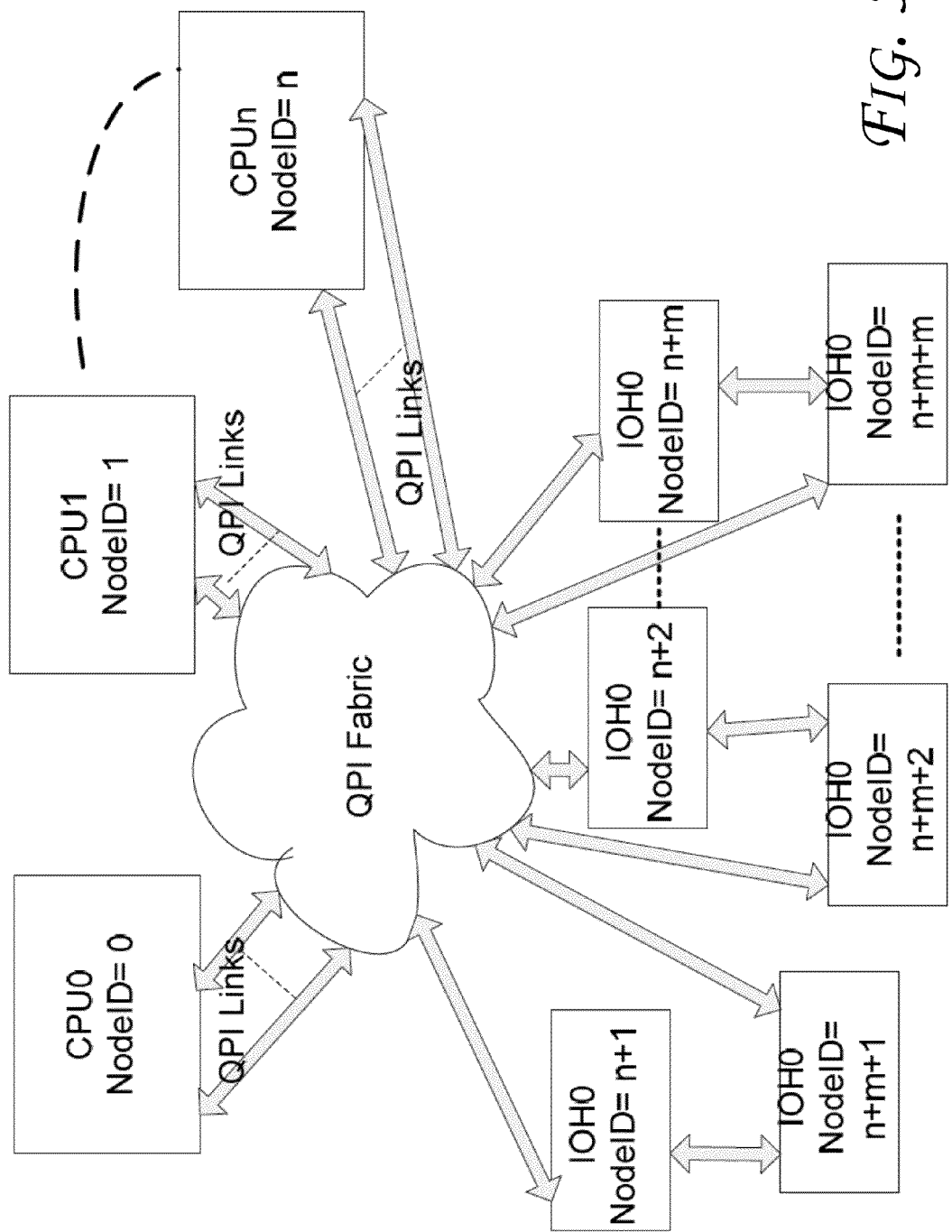

In accordance with an embodiment, if CPU's pre-allocated resources are exhausted and there is no scope of adding more IOH in system, m more IOH may be coupled. This is shown in FIG. 5. Each pair of coupled IOHs may be represented as one IOH and within each pair one IOH may target requests to a set of CPUs while another IOH targets requests to rest of CPUs. Accordingly, some embodiments may add one more IOH in QPI platform without knowledge and support of CPU and without any design requirement from CPU. Hence, QPI based design may provide for proxy capability to hide another QPI agent. Also, multiple QPI domains may be handled between CPU2IOH and IOH2IOH. This may involve addition of new QPI transactions flows, e.g., not exiting in QPI specification. The micro architected embodiment may be provided in such a way to keep single IOH functionality unchanged, e.g., with two IOHs using the same NodeID as discussed above. As a result, each IOH is hidden from a remote CPU while visible to local CPU. The CPUs may still have their own route to interact with each other. In turn, the IOH to IOH QPI link may be used for communication between the IOHs. It may also be noted that in some embodiments of this invention, two or more IOHs may be daisy-chained with either one or both IOHs at the end of the daisy chain coupled to one or two CPUs.

Various storage devices (such as the memories shown in FIGS. 2-4) may be utilized herein to store data (including instructions). For example, storage device(s) may include volatile and/or nonvolatile memory (or storage). Nonvolatile memory may include one or more of the following: read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, or other types of nonvolatile machine-readable media that are capable of storing electronic data (e.g., including instructions). Volatile storage (or memory) devices may include random access memory (RAM), dynamic RAM (DRAM), synchronous DRAM (SDRAM), static RAM (SRAM), or other types of storage devices. Also, various components discussed with reference to FIGS. 1-5 may communicate with other components through a computer network (e.g., via a modem, network interface device, or other communication devices).

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein. Additionally, such computer-readable media may be downloaded as a computer program product, wherein the program may be transferred from a remote computer (e.g., a server) to a requesting computer (e.g., a client) by way of data signals, e.g., via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first input output hub (IOH);
a second IOH coupled to the first IOH via a first link interconnect, wherein the first IOH and the second IOH share a single node identifier to be used by a plurality of processors and wherein the plurality of processors comprise pre-allocated resources for a single IOH, wherein the first IOH comprises a Remote IOH Request Queue (RIQ) to temporarily store requests from the second IOH that are directed to a first processor of the plurality of processors, wherein the first processor is coupled to the first IOH via a second link, wherein the second IOH is to communicate with the plurality of processors only via the first IOH.

2. The apparatus of claim 1, wherein the first IOH comprises an Incoming Request Handler (IRH) to handle requests originated from any other agent and targeted to the first IOH.

3. The apparatus of claim 1, wherein the first IOH comprises a first request handler, corresponding to a first processor of the plurality of processors, and a second request handler, corresponding to a second processor of the plurality of processors.

4. The apparatus of claim 3, wherein the first request handler or the second request handler comprise an Outstanding Request Buffer (ORB) to store requests from agents targeted to the first or second processors.

5. The apparatus of claim 1, wherein the pre-allocated resources comprise an Incoming Request Tracker (IRT) to track incoming requests at each agent of the apparatus.

6. The apparatus of claim 1, wherein each pair of the plurality of processors is coupled via a second link interconnect.

7. The apparatus of claim 1, further comprising a link layer to implement a per message class credit mechanism for information transfer between a plurality of agents.

8. The apparatus of claim 1, wherein the first link interconnect comprises a Quick Path Interconnect (QPI).

9. The apparatus of claim 1, wherein one or more of the plurality of processors comprise a plurality of processor cores.

10. The apparatus of claim 1, wherein the first IOH, the second IOH, and the plurality of processors are on a same integrated circuit die.

11. The apparatus of claim 1, wherein the first processor communicates with the second IOH via the first IOH.

12. The apparatus of claim 1, wherein the number of entries in the RIQ of the first IOH are equal to the number of entries in an Outstanding Request Buffer (ORB) of the second IOH.

13. A method comprising:
coupling a first IOH to a second IOH via a first link interconnect;
sharing a single node identifier for the first IOH and the second IOH to be used by a plurality of processors,
wherein the plurality of processors comprise pre-allocated resources for a single IOH, wherein the first IOH comprises a Remote IOH Request Queue (RIQ) to temporarily store requests from the second IOH that are directed to a first processor of the plurality of processors, wherein the first processor is coupled to the first IOH via a second link interconnect, wherein the second IOH communicates with the plurality of processors only via the first IOH.

14. The method of claim 13, further comprising storing requests from agents targeted to the plurality of processors in an Outstanding Request Buffer (ORB).

15. The method of claim 13, wherein the pre-allocated resources comprise an Incoming Request Tracker (IRT) to track incoming requests at each agent.

16. The method of claim 13, wherein the number of entries in the RIQ of the first IOH are equal to the number of entries in an Outstanding Request Buffer (ORB) of the second IOH.

17. A system comprising:
a plurality of processors;
a first input output hub (IOH);
a second IOH coupled to the first IOH via a first link interconnect, wherein the first IOH and the second IOH share a single node identifier to be used by the plurality of processors and wherein the plurality of processors comprise pre-allocated resources for a single IOH, wherein the first IOH comprises a Remote IOH Request Queue (RIQ) to temporarily store requests from the second IOH that are directed to a first processor of the plurality of processors, wherein the first processor is coupled to the first IOH via a second link, wherein the second IOH is to communicate with the plurality of processors via the first IOH.

18. The system of claim 17, wherein the first IOH comprises an Incoming Request Handler (IRH) to handle requests originated from any other agent and targeted to the first IOH.

19. The system of claim 18, wherein the first IOH comprises a first request handler, corresponding to a first processor of the plurality of processors, and a second request handler, corresponding to a second processor of the plurality of processors.

20. The system of claim 18, wherein the number of entries in the RIQ of the first IOH are equal to the number of entries in an Outstanding Request Buffer (ORB) of the second IOH.

* * * * *